United States Patent
Huang et al.

(10) Patent No.: US 10,194,394 B2
(45) Date of Patent: *Jan. 29, 2019

(54) INTEGRATION OF WAKE UP RADIO WITH EXISTING POWER SAVE PROTOCOL

(71) Applicant: Intel IP Corporation, Santa Clara, CA (US)

(72) Inventors: Po-Kai Huang, San Jose, CA (US); Robert J. Stacey, Portland, OR (US); Minyoung Park, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/392,398

(22) Filed: Dec. 28, 2016

(65) Prior Publication Data
US 2018/0049131 A1   Feb. 15, 2018

(51) Int. Cl.
*H04W 52/02*   (2009.01)
*H04W 84/12*   (2009.01)

(52) U.S. Cl.
CPC ... *H04W 52/0235* (2013.01); *H04W 52/0248* (2013.01); *H04W 84/12* (2013.01)

(58) Field of Classification Search
CPC ............. H04W 52/02; H04W 52/0203; H04W 52/0235; H04W 52/0248; H04W 74/08;
(Continued)

(56) References Cited

U.S. PATENT DOCUMENTS

| 7,720,513 B2 * | 5/2010 | Enenkl | G06F 1/3203 |
| | | | 455/343.1 |
| 8,631,254 B2 * | 1/2014 | Kwak | H04B 13/005 |
| | | | 713/300 |

(Continued)

FOREIGN PATENT DOCUMENTS

EP   2833 680   *   2/2015

OTHER PUBLICATIONS

Zhou, Ultra-low Power Wake-up Radio for Low Activity Wireless System, Thesis, University of California at Berkeley, 106 pages, Dec. 2016.*

(Continued)

*Primary Examiner* — Frank Duong
(74) *Attorney, Agent, or Firm* — Schwegman Lundberg & Woessner, P.A.

(57) ABSTRACT

Embodiments of a low-power wake-up radio (LP-WUR) are generally described herein. In some embodiments, a wireless device is set to a first state or a second state, wherein in the first state the wireless device is configured to receive wake-up (WU) packets, and wherein in the second state the wireless device is configured to not receive WU packets, wherein the wireless device comprises a WLAN radio and a low-power wake-up radio (LP-WUR). In some embodiments, the wireless device is configured to receive a wake-up packet, turn on the WLAN radio and turn off the LP-WUR. In some embodiments, the wireless device is configured to turn off the WLAN radio and turn on the LP-WUR for power conservation. In some embodiments, (Continued)

the wireless device turns off the WLAN radio and turns off the LP-WUR, and can periodically turn on the LP-WUR radio for extreme power saving.

20 Claims, 8 Drawing Sheets

(58) Field of Classification Search
CPC ..... H04W 80/04; H04W 84/12; H04W 84/18; H04W 88/06; H04W 88/08
See application file for complete search history.

(56) References Cited

U.S. PATENT DOCUMENTS

| | | | | |
|---|---|---|---|---|
| 8,824,345 | B2* | 9/2014 | Kim | H04W 52/0235 |
| | | | | 370/311 |
| 8,953,718 | B2* | 2/2015 | Oehler | H04W 52/0229 |
| | | | | 375/316 |
| 9,191,890 | B2* | 11/2015 | Jafarian | H04W 52/0209 |
| 2008/0108318 | A1* | 5/2008 | Min | H04W 52/0229 |
| | | | | 455/343.1 |

OTHER PUBLICATIONS

Piyare et al, Ultra Low Power Wake-Up Radios: A Hardware and Networking Survey, IEEE, 41 pages, 2017.*

* cited by examiner

US 10,194,394 B2

INTEGRATION OF WAKE UP RADIO WITH EXISTING POWER SAVE PROTOCOL

PRIORITY CLAIM

This application claims the benefit of priority to U.S. Provisional Patent Application Ser. No. 62/374,154, filed, Aug. 12, 2016, and entitled "Integration of Wake-Up Radio with Existing Power Save Protocol," which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ay. Some embodiments relate to methods, computer readable media, and apparatus for integration of wake-up radio with existing power save protocol.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

Figure 1:
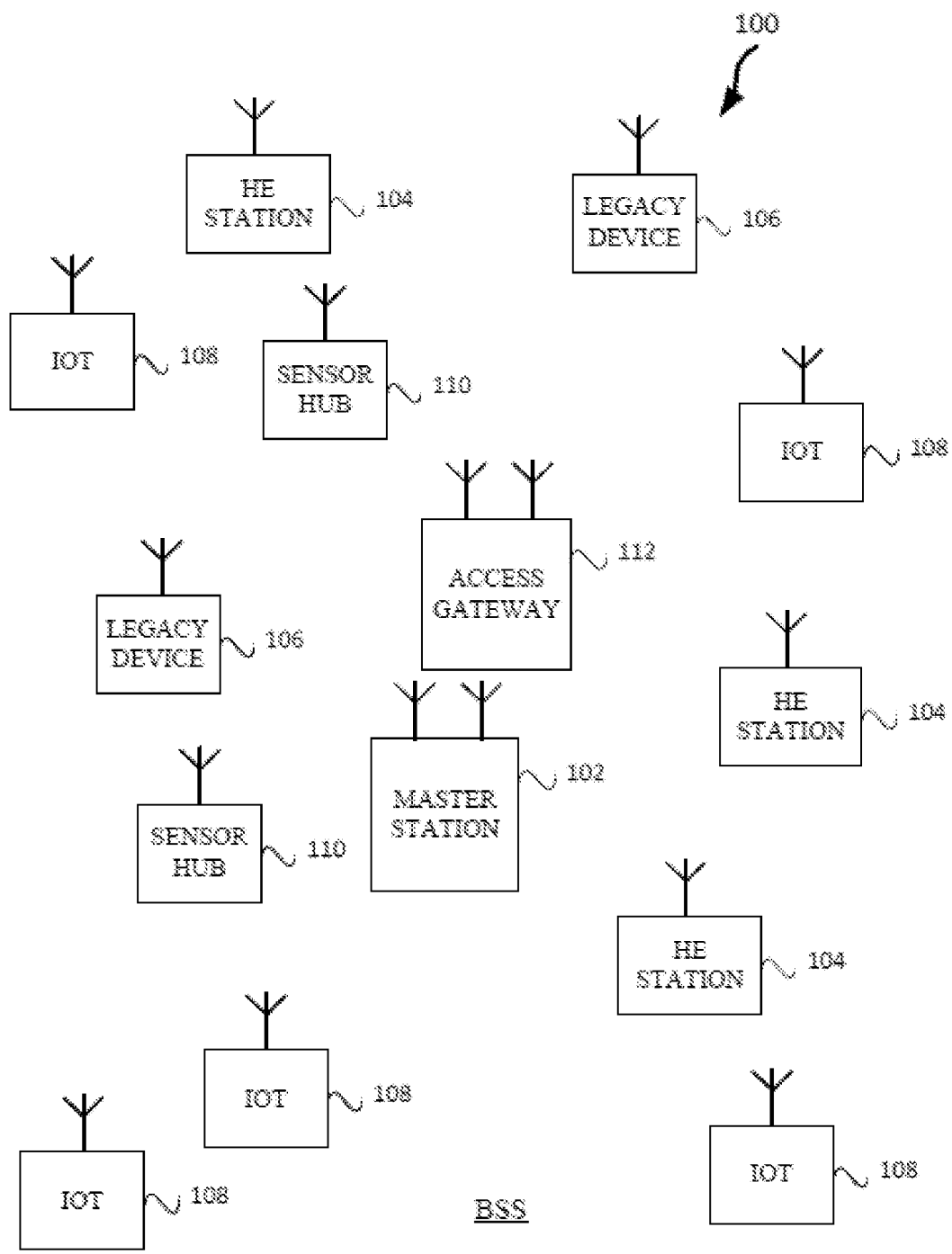
FIG. 1 illustrates a wireless network, in accordance with some embodiments.

In recent years, applications have been developed relating to social networking, Internet of Things (IoT), wireless docking, and the like. It may be desirable to design low power solutions that can be always-on. Multiple efforts are ongoing in the wireless industry to address this challenge. In some aspects, the subject technology uses the Wi-Fi alliance (WFA) neighbor aware networking (NAN) program to define a mechanism for Wi-Fi devices to maintain low power and achieve service discovery. In Bluetooth® Special Interest Group (SIG), Bluetooth® Low Energy provides a power-efficient protocol for some use cases. In the Institute of Electrical and Electronics Engineers (IEEE), low-power wake-up radio (LP-WUR) has gained interest. The idea of the LP-WUR is to utilize an extremely low power radio such that a device can be in listening mode with minimum capability and consume extremely low power. If the main radio is required for data transmission, a wake-up packet may be sent out by a peer device to wake-up the main wireless local area network (WLAN) radio (e.g., Wi-Fi radio).

A LP-WUR enables ultra-low power operation of devices, for example, Wi-Fi devices. In some embodiments, a device including a LP-WUR can receive one or more wake-up packets from a peer device, enabling the device to stay in a low-power mode until receiving the wake-up packet. A wake-up packet may be transmitted from a station (STA) to an access point (AP) or from an AP to a STA to cause the receiver to wake up its WLAN radio. Aspects of the subject technology relate to a low-power wake-up radio (LP-WUR) architectures and signaling, for example, a LP-WUR architectures and signaling for use in orthogonal frequency division multiplexing (OFDM) based Wi-Fi systems. The LP-WUR provides a low-power solution (e.g., approximately 100 µW in active state) for always-on Wi-Fi (or Bluetooth®) connectivity of wearable, IoT (Internet of Things) and other emerging devices that may be densely deployed and used. In some embodiments, the LP-WUR is configured to operate within the legacy 802.11a/g/n/ac specifications by the Institute of Electrical and Electronics Engineers, utilizing a 4 microsecond OFDM symbol duration.

Embodiments described herein can address integration of LP-WURs with existing power save protocols, for example, existing power save protocols for devices configured for Wi-Fi protocols (e.g., IEEE 802.11). Certain embodiments of LP-WURs, as described below, can maintain current IEEE 802.11 power save states and protocols, for example, without changes to existing power save protocols, without changes to definitions for power management modes other than active and power save modes of the current power save protocols, and without changes to definitions for new states of IEEE 802.11 devices. In some embodiments, the only changes to definitions for new states of IEEE 802.11 devices are "Awake" states and "Doze" states, and these can be applied for example to a LP-WUR.

Some embodiments relate to signaling for an IEEE 802.11 device, for example, an IEEE 802.11 device may be configured to transmit radio frequency (RF) signals indicating the state of the LP-WUR. With respect to the IEEE 802.11 radio state, in some embodiments, an AP may know the state of a STA based on existing signaling and power save protocols.

In some embodiments, signaling for the purpose of identifying the state of an IEEE 802.11 device can be separated from the LP-WUR radio. For example, signaling for the purpose of indicating a LP-WUR radio state may not need to override the existing signaling that identifies the state of an IEEE 802.11 radio. Further, in some embodiments, existing power save protocols may not need to be changed to indicate a LP-WUR radio state.

In some embodiments, the state of a LP-WUR can be isolated from the state of another radio (e.g., an IEEE 802.11 radio). For example, a LP-WUR radio may wake-up more than one IEEE 802.11 radio, such as one or more radios operating in different frequency bands (e.g., 2.4 GHz radio, 5 GHz radio). In some embodiments, IEEE 802.11 radio additional power management modes may not be needed, allowing all current power management and power save protocols with respect to the IEEE 802.11 radio to remain unchanged. In some embodiments, states for an IEEE 802.11 radio may not need to be redefined and additional states may not need to be added. Aspects are described in more detail with respect to FIGS. 4-8.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIG. 1 illustrates a wireless network (e.g., WLAN 100) in accordance with some embodiments. The WLAN may comprise a basis service set (BSS) 100 that may include one or more master stations 102, which may be APs, one or more high efficiency (HE) wireless stations (HE stations) (e.g., IEEE 802.11ax) HE stations 104, a plurality of legacy (e.g., IEEE 802.11n/ac) devices 106, a plurality of IoT devices 108 (e.g., IEEE 802.11ax), and one or more sensor hubs 110.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 may be a virtual master station 102 shares hardware resources with another wireless device such as another master station 102.

The legacy devices 106 may operate in accordance with one or more of IEEE 802.11a/b/g/n/ac/ad/af/ah/aj, or another legacy wireless communication standard. The legacy devices 106 may be STAs or IEEE STAs. The HE stations 104 may be wireless transmit and receive devices such as cellular telephone, smart telephone, handheld wireless device, wireless glasses, wireless watch, wireless personal device, tablet, a portable wireless device, or another device that may be transmitting and receiving using the IEEE 802.11 protocol such as IEEE 802.11ax or another wireless protocol. In some embodiments, the HE stations 104 may be termed high efficiency wireless local-area network (HEW) stations.

The master station 102 may communicate with legacy devices 106 in accordance with legacy IEEE 802.11 communication techniques. In example embodiments, the master station 102 may also be configured to communicate with HE stations 104 in accordance with legacy IEEE 802.11 communication techniques.

The IoT devices 108 may operate in accordance with IEEE 802.11ax or another standard of 802.11. The IoT devices 108 may be, in some embodiments, narrow band devices that operate on a smaller sub-channel than the RE stations 104. For example, the IoT devices 108 may operate on 2.03 MHz or 4.06 MHz sub-channels. In some embodiments, the IoT devices 108 are not able to transmit on a full 20 MHz sub-channel to the master station 102 with sufficient power for the master station 102 to receive the transmission. In some embodiments, the IoT devices 108 may not be able to receive on a 20 MHz sub-channel and may use a small sub-channel such as 2.03 MHz or 4.06 MHz sub-channel. In some embodiments, the IoT devices 108 may operate on a sub-channel with exactly 26 or 52 data sub-carriers. The IoT devices 108, in some embodiments, may be short-range, low-power devices.

The IoT devices 108 may be battery constrained. The IoT devices 108 may be sensors designed to measure one or more specific parameters of interest such as temperature sensor, pressure sensor, humidity sensor, light sensor, etc. The IoT devices 108 may be location-specific sensors. Some IoT devices 108 may be connected to a sensor hub 110. The IoT devices 108 may upload measured data from sensors to the sensor hub 110. The sensor hubs 110 may upload the data to an access gateway 112 that connects several sensor hubs 110 and can connect to a cloud sever or the Internet (not illustrated). The master station 102 may act as the access gateway 112 in accordance with some embodiments. The master station 102 may act as the sensor hub 110 in accordance with some embodiments. The IoT device 108 may have identifiers that identify a type of data that is measured from the sensors. In some embodiments, the IoT device 108 may be able to determine a location of the IoT device 108 based on received satellite signals or received terrestrial wireless signals.

In some embodiments, at least some of the IoT devices 108 need to consume very low average power in order to perform a packet exchange with the sensor hub 110 and/or access gateway 112. The IoT devices 108 may be densely deployed.

The IoT devices 108 may enter a power save mode and may exit the power save at intervals to gather data from sensors and/or to upload the data to the sensor hub 110 or access gateway 112.

In some embodiments, the master station 102 HE stations 104, legacy stations 106, IoT devices 108, access gateways 112, Bluetooth™ devices, and/or sensor hubs 110 enter a power save mode and exit the power save mode periodically or at a pre-scheduled times to see if there is a packet for them to be received. In some embodiments, the master station 102 HE stations 104, legacy stations 106, IoT devices 108, access gateways 112, Bluetooth™ devices, and/or sensor hubs 110 may remain in a power save mode until receiving a wake-up packet.

In some embodiments, a HE frame may be configurable to have the same bandwidth as a subchannel. The bandwidth of a sub-channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 2.03125 MHz, 4.0625 MHz, 8.28125 MHz, a combination thereof or another bandwidth that is less or equal to the available bandwidth may also be used. The sub-channel may be based on a number of data sub-carriers or data tones, e.g. 26 or 52 with additional subcarriers that may be used for other reasons such as DC nulls, guard intervals, beacons, or another use other than data tones. In some embodiments the bandwidth of the sub-channels may be based on a number of active subcarriers.

In some embodiments, the bandwidth of a sub-channel may be equivalent to one of OFDMA sub-channels defined in IEEE 802.11ax. In some embodiments, the OFDMA sub-channels of IEEE 802.11ax that are less than 20 MHz are equivalent to 26-tone, 52-tone and 106-tone allocations. The bandwidth of these OFDMA allocations may be 20 MHz divided by 256 of a Fast Fourier Transform (FFT)-size times 26 or 52 or 106, for bandwidths of 2.03125 MHz, 4.0625 MHz, or 8.28125 MHz, respectively. In some embodiments, the sub-channels may be a combination thereof or another bandwidth that is less or equal to the available bandwidth may also be used.

A HE packet may be configured for transmitting a number of spatial streams, which may be in accordance with MU-MIMO. In other embodiments, the master station 102, HE stations 104, sensor hubs 110, access gateway 112, and/or legacy devices 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE trigger frame, which may be a trigger packet or HE control and schedule transmission, at the beginning of the HEW control period. The master station 102 may transmit a time duration of the TXOP and sub-channel information. During the HE control period, HEW stations 104 may communicate with the master station 102 in accordance with a non-contention based multiple access technique such as OFDMA or MU-MIMO.

This is unlike conventional wireless local-area network (WLAN) communications in which devices communicate in accordance with a contention-based communication technique, rather than a multiple access technique. During the HE control period, legacy stations refrain from communicating.

In some embodiments, the multiple-access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106, sensor hubs 110, access gateway 112, and/or HE stations 104 in accordance with legacy IEEE 802.11 communication techniques. In example embodiments, a master station 102, access gateway 112, HE station 104, legacy station 106, IoT devices 108, and/or sensor hub 110 may be configured to perform the methods and functions herein described in conjunction with FIGS. 1-7.

Figure 2:
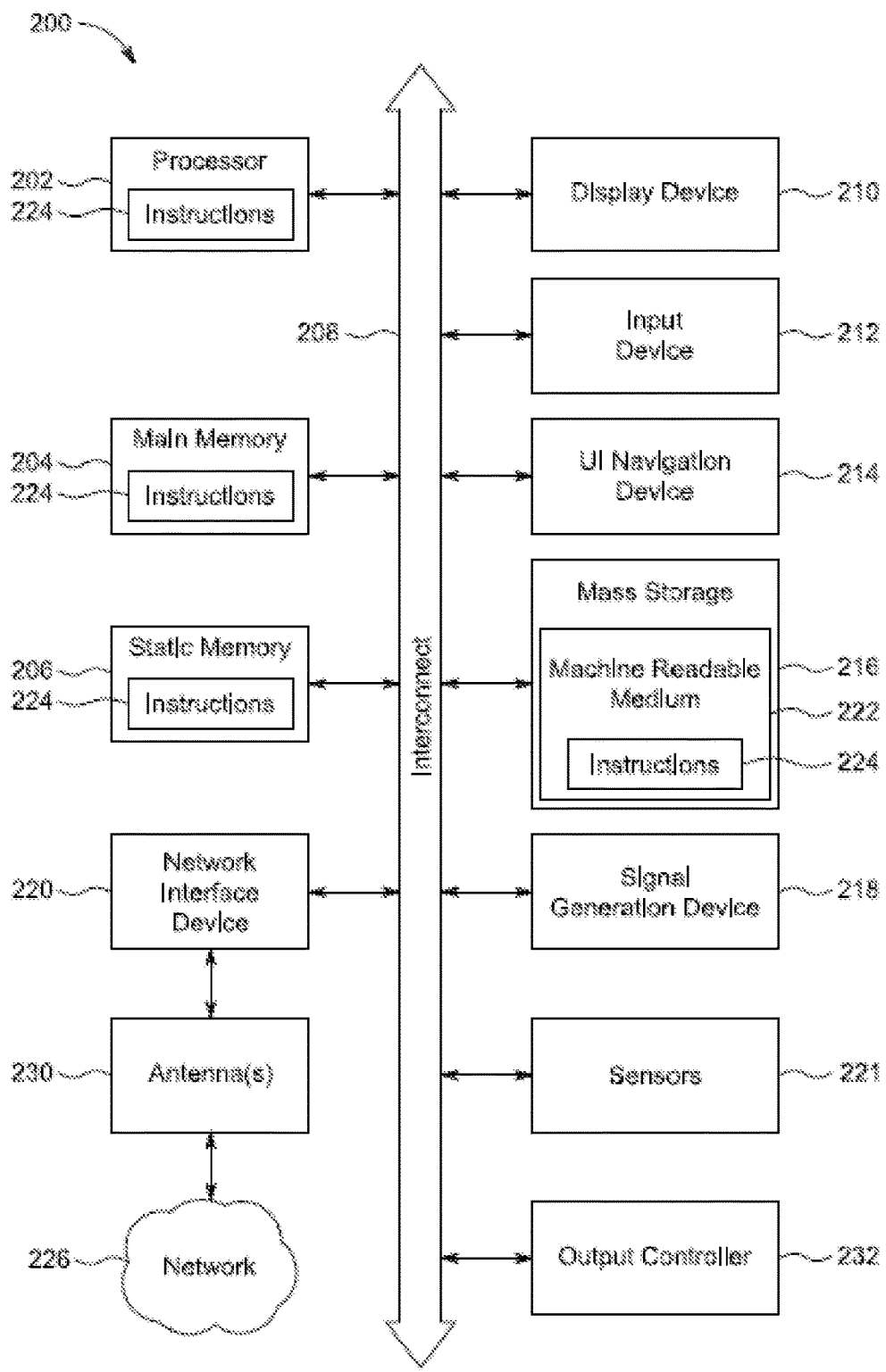
FIG. 2 illustrates an example machine, in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HEW device, HEW AP, HEW STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
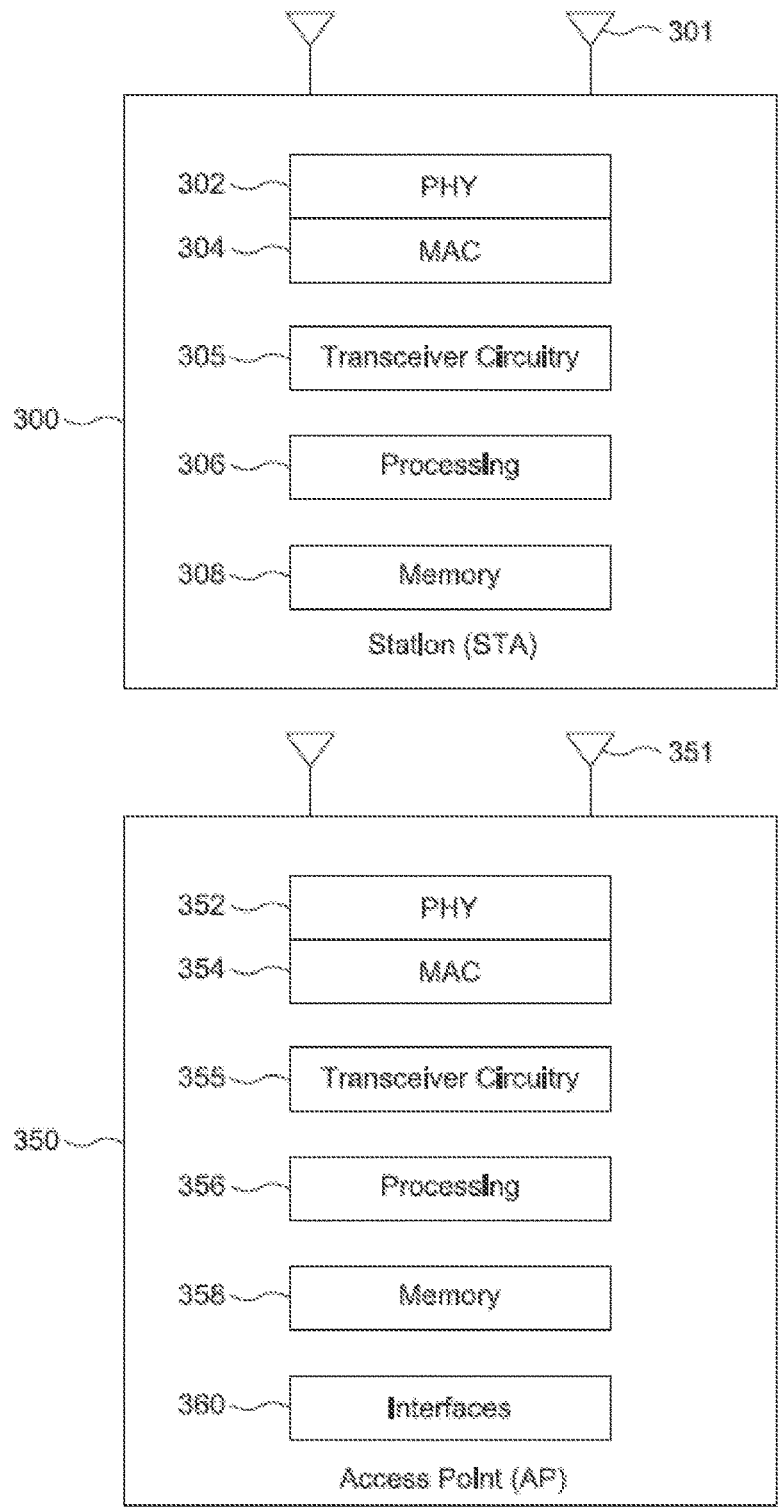
FIG. 3 illustrates a station (STA) in accordance with some embodiments and an access point (AP), in accordance with some embodiments.

FIG. 3 illustrates a STA in accordance with some embodiments and an AP in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium.

The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HEW device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HEW device 104 may be configured to communicate using OFDM communication signals over a multicarrier communication channel. Accordingly, in some cases, the STA 300, AP 350 and/or HEW device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the AP 350, HEW device 104 and/or the STA 300 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

As described herein, some embodiments define states for one or more wake-up radio or receiver (e.g., LP-WUR). For example, two states can be defined for a LP-WUR, including a first state wherein the device is configured to receive wake-up packet, and a second state wherein the device is configured to not receive a wake-up packet. In such an example, the first state can be an Awake state, and the second state can be a Doze state. In alternative embodiments, the terms used for these states can vary, for example, the second state may be a Sleep state. In some embodiments, a wake-up radio (WUR) mode can include one or more of these states.

As described above, the state of the LP-WUR can, in some embodiments, be independent of the states for an IEEE 802.11 radio. In some embodiments, an IEEE 802.11 device can be defined to have LP-WUR capability, for example, with four possible two dimensional states as illustrated in Table 1 below.

TABLE 1

| Possible cases | (802.11 radio state, WUR radio state) |
|---|---|
| 1 | (awake, awake) |
| 2 | (awake, doze) |
| 3 | (doze, awake) |
| 4 | (doze, doze) |

Referring to Case 1, an 802.11 radio state is set to Awake and a LP-WUR state is set to Awake. In some embodiments, in Case 1, the 802.11 radio is able to receive signals (e.g., the 802.11 radio in the STA can receive RF signals from an AP) and the LP-WUR is also able to receive signals (e.g., the LP-WUR 425 in the STA can receive signals from an AP). In some embodiments, an STA is configured to receive a wake-up packet from an associated AP and send packets to the AP.

In Case 2, an 802.11 radio state is set to Awake and a LP-WUR state is set to Doze. In some embodiments, in Case 2, the 802.11 radio is able to receive signals (e.g., the 802.11 radio in the STA is able to receive signals from an AP) and the LP-WUR is disabled from receiving signals (e.g., the LP-WUR 425 in the STA does not receive signals from an AP). In some embodiments, a STA is configured to receive a wake-up packet from the AP for the purpose of turning on the 802.11 radio and turning off the LP-WUR.

In Case 3, an 802.11 radio state is set to Doze and a LP-WUR state is set to Awake. In some embodiments, in Case 3, the 802.11 radio is disabled from receiving signals (e.g., the 802.11 radio in the STA is not able to receive signals from an AP) and the LP-WUR is able to receive signals (e.g., the LP-WUR 425 in the STA can receive signals from an AP). In some embodiments, a STA is configured to turn off the 802.11 radio and utilize the LP-WUR to save power.

In Case 4, an 802.11 radio state is set to Doze and a LP-WUR radio state is set to Doze. In some embodiments, in Case 4, the 802.11 radio is disabled from receiving signals (e.g., the 802.11 radio in the STA is not able to receive signals from an AP) and the LP-WUR is disabled from receiving signals (e.g., the LP-WUR 425 in the STA does not receive signals from an AP). In some embodiments, a STA is configured to save power (e.g., extreme power save) while still being capable of waking the LP-WUR radio periodically.

In some embodiments, a wireless device (e.g., a wireless device having a LP-WUR and a WLAN radio) may transmit a request signal to an AP in order to enable a power save protocol between the AP and the wireless device. In some embodiments, the request signal may include one or more parameters defining the power save protocol and the wireless device may receive a response signal, including one or more of the parameters, from the AP acknowledging the request signal. The one or more parameters of the request signal may include WUR parameters with respect to a wake-up radio (WUR) mode for a STA (e.g., a LP-WUR of a STA), for example, an indication of a duration of time that the STA (e.g., LP-WUR of a STA) is in a WUR mode.

In some embodiments, with respect to a WUR mode, a LP-WUR of a wireless device is configured to receive wake-up packets from the AP and a WLAN radio of the wireless device is configured to refrain from receiving RF signals.

In some embodiments, during the WUR mode, a LP-WUR of a wireless device may be configured to be in an Awake state, wherein during the Awake state the LP-WUR is configured to receive wake-up packets, and a WLAN radio of the wireless device is turned off. In some embodiments, in response to the LP-WUR of the wireless device receiving a wake-up packet while in WUR mode (e.g., receiving a wake-up packet from an AP), the WLAN radio can change from a Doze state to an Awake state. In the Doze state, for example, the WLAN radio may be configured to refrain from receiving RF signals from peer devices. In the Awake state, for example, the WLAN radio can receive RF signals from peer devices.

Further, in response to the LP-WUR of the wireless device receiving a wake-up packet while in WUR mode, in some embodiments, the LP-WUR radio can change from an Awake state to a Doze state. In the Awake state, for example, the LP-WUR can receive wake-up packets and during the Doze state the LP-WUR can refrain from receiving wake-up packets. In some embodiments, after the WLAN radio of the wireless device changes to an Awake state, the WLAN can receive data packets from an AP. In some embodiments, the wireless device may be configured to periodically enter the WUR mode. In such embodiments, one or more parameters of a request signal (e.g., a request signal sent to an AP from the wireless device) can include a service identifier (ID), protocol support information, and an indication of a specific schedule that the wireless device is in the WUR mode.

In some embodiments, the WLAN radio may be configured to remain in a Doze state, during a duration of time that the wireless device is in the WUR mode, until the LP-WUR of the wireless device receives a wake-up packet.

Figure 4:
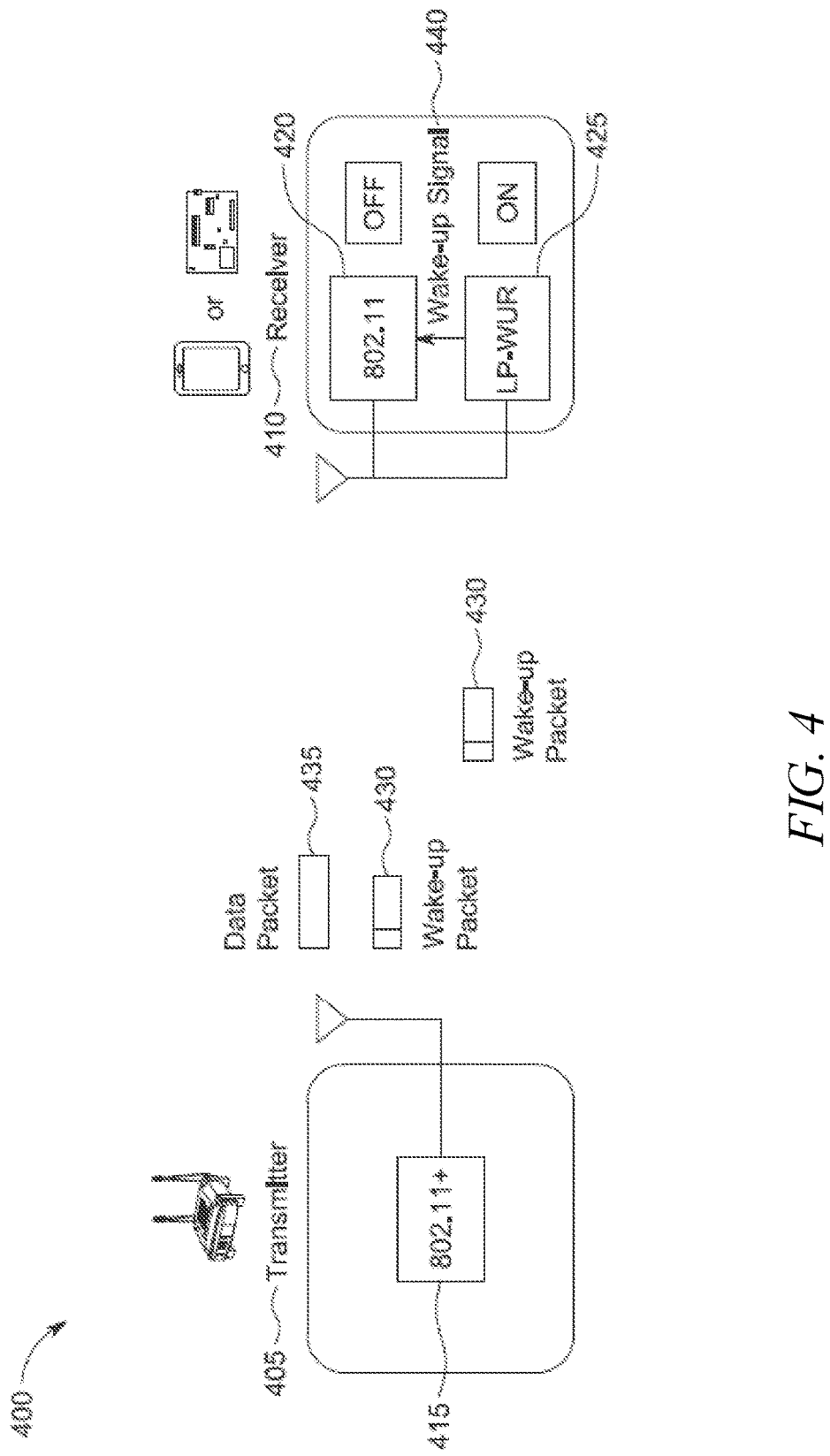
FIG. 4 illustrates an example of a WiFi device (e.g., an IEEE 802.11 device) with a low power wake up receiver (LP-WUR) in accordance with some embodiments.

FIG. 4 illustrates an example system 400 in which a LP-WUR (e.g., LP-WUR 425) is operated. As shown, the system 400 includes a transmitter 405 and a receiver 410. The transmitter 405 may be a WLAN station (e.g., Wi-Fi router) and the receiver 410 may be a computing device capable of connecting to the WLAN station, such as a mobile phone, a tablet computer, a laptop computer, a desktop computer, and the like. The transmitter 405 includes an WLAN (802.11+) radio 415. The receiver 410 includes a WLAN (802.11) radio 420 (e.g., Wi-Fi radio) and a LP-WUR 425. The WLAN radio 415 of the transmitter 405 transmits one or more wake-up packets 430. One of the wake-up packets 430 is received at the LP-WUR 425 of the receiver 420. Upon receiving the wake-up packet 430, the LP-WUR 425 sends a wake-up signal 440, which causes the WLAN radio 420 of the receiver 410 to turn on. The WLAN radio 415 of the transmitter 405 transmits data packet(s) 435 to the WLAN radio 420 of the receiver 410, and the WLAN radio 420 of the receiver 410 receives the data packet(s) 435.

Some embodiments, described herein with respect to FIGS. 5 through 8, relate to defining a negotiation process whereby a device (e.g., wireless device 410 or a STA) having a WLAN radio (e.g., 802.11 radio 420) and a wake-up radio (e.g., LP-WUR 425) enters a wake-up radio (WUR) mode. Some embodiments, described herein with respect to FIGS. 5 through 8, relate to duty cycles for a LP-WUR (e.g., LP-WUR 425), including Awake and Doze/Sleep patterns. Some embodiments, described herein with respect to FIGS. 5 through 8, relate to explicit signaling (e.g., PM bit) used by a STA to indicate that LP-WUR 425 is on. When AP receives the explicit signaling, AP can start to send wake up packets to the STA and stop sending data to the STA. In some embodiments, features designed for Wireless Network Management (WNM) that allow for extensive time for sleep can also be utilized for a LP-WUR. In such embodiments, the signaling for the LP-WUR can be similar to WNM signaling.

Figure 5:
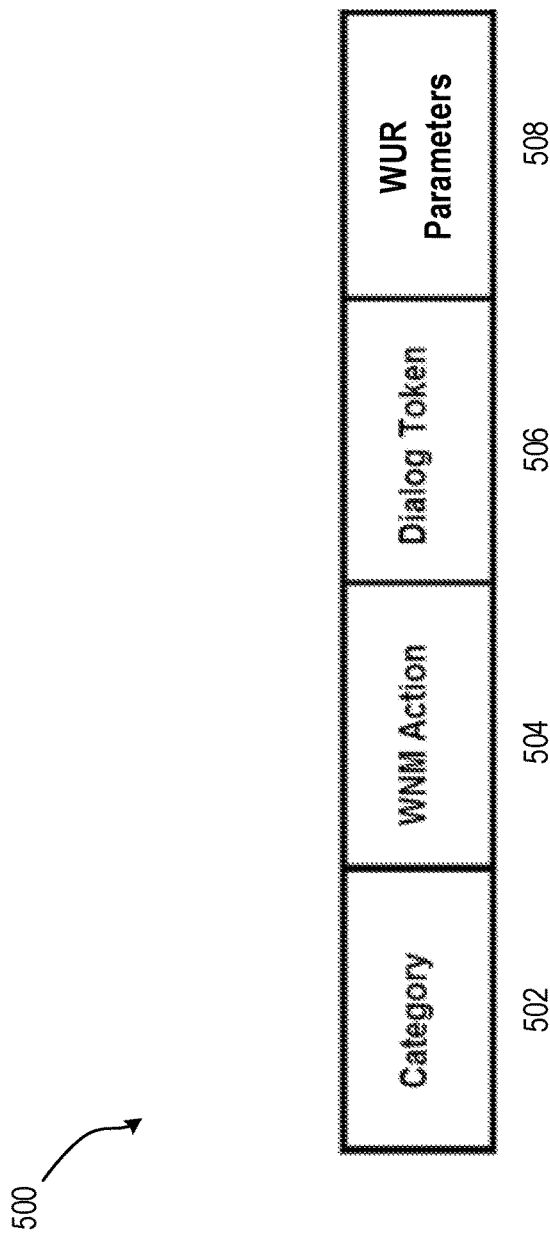
FIG. 5 illustrates an example request and/or response signal frame format in accordance with some embodiments.

FIG. 5 illustrates an example request and/or response signal frame (e.g., WNM Action frame) format 500, in accordance with some embodiments. In some embodiments, a STA can encode a request signal in a WNM Action frame format 500 for transmission to an AP. In some embodiments, a WNM Action frame format 500 may be implemented with a standard power-save protocol. For example, a STA may utilize a WNM Action frame format 500 to communicate WUR mode actions related to a LP-WUR and WLAN radio of the wireless device with an AP, and the WNM Action frame format 500 may define parameters associated with a power-save protocol for a LP-WUR. Some examples of parameters carried in a WNM Action frame format 500 can include Category 502, WNM Action 504, Dialog Token 506, and other WUR parameters 508.

In some embodiments, a WNM Action frame format 500 is used for the purpose of request and/or response signaling with respect to a wireless device (e.g., STA) having a wake-up radio (e.g., LP-WUR 425). In some embodiments, the WNM Action frame format 500 may include one or more parameters of a request or response signal, for example, indications of time durations that the wireless device is in a wake-up radio (WUR) mode. A wireless device or STA (e.g., a wireless device having a LP-WUR and a WLAN radio) may transmit a request signal to an AP in order to enable a power save protocol between the AP and the wireless device. In some embodiments, a request or response signal, such as WNM Action frame format 500, may include one or more parameters (e.g., parameters 502-508) defining the power save protocol and the wireless device (e.g., STA) may receive a response signal, including one or more of the parameters, from the AP acknowledging the request signal. In some embodiments, in response to a request signal from a STA, an AP may encode a response signal utilizing a WNM Action frame format, for transmission to a STA, to acknowledge the request signal. Further, in some embodiments, the STA may transmit to the AP a WUR signal indicating that the wireless device is entering a WUR mode. The WUR signal may be included within the WNM Action frame format 500 or within a request/response signal format 600, with respect to FIG. 6.

In some embodiments, the STA can use the WNM Action frame format 500 to negotiate with an AP an interval of sleep or wake-up duration of a LP-WUR or WLAN radio of a STA, and these parameters can be defined in WUR Parameters 508. In some embodiments, the STA (e.g., wireless device having a LP-WUR and WLAN) can communicate to an AP an interval of time that the wireless device will be in a WUR mode, including one or more of the parameters defined in in an action frame, including a WNM Action frame (e.g., WNM Action frame 500), among other action frames.

In some embodiments of a WUR mode, a LP-WUR of a wireless device or STA (e.g., LP-WUR 425) may be configured to receive wake-up packets from an AP and a WLAN radio of the wireless device may be configured to refrain from receiving RF signals (e.g., refrain from receiving data packets from an AP). In some embodiments, during the WUR mode, the LP-WUR of the wireless device is configured to be in an Awake state, wherein during the Awake state the LP-WUR is configured to receive wake-up packets, and the WLAN radio of the wireless device is turned off In some embodiments, in utilizing the WNM Action frame format 500, certain existing features defined by WNM sleep, such as a skipping delivery traffic indication map (DTIM) beacon, no group a temporal key (GTK)/integrity GTK (IGTK) security update, and traffic filtering can be utilized with respect to a LP-WUR.

Figure 6:
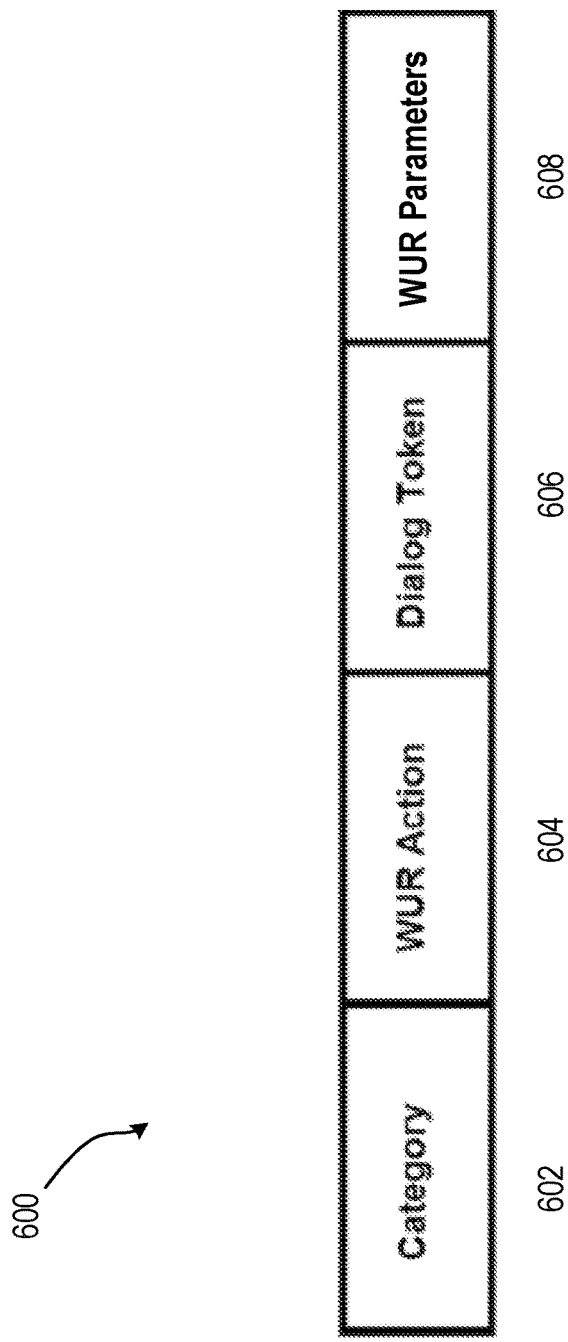
FIG. 6 illustrates an example request and/or response signal frame format in accordance with some embodiments.

FIG. 6 illustrates an example request and/or response signal format (e.g., WUR Action frame format 600), in accordance with some embodiments. In some embodiments, a request signal can be an action frame in an event request action field format. In some embodiments, a STA can encode a request signal in a WUR Action frame format 600 for transmission to an AP. In some embodiments, a WUR Action frame format 600 may be implemented with a standard power-save protocol. For example, a STA may utilize a WUR Action frame format 600 to communicate WUR mode actions related to a LP-WUR and WLAN radio of the wireless device with an AP, and the WUR Action frame format 600 may define parameters associated with a power-save protocol for a LP-WUR. Some examples of parameters carried in a WUR Action frame format 600 can include Category 602, WUR Action 604, Dialog Token 606, and other WUR parameters 608.

In some embodiments, the WUR Action frame format 600 is used for the purpose of request and/or response signaling with respect to a wireless device or STA having a wake-up radio (e.g., LP-WUR 425). In some embodiments, the WUR Action frame format 600 may include one or more parameters of a request or response signal, for example, indications of a time durations that the wireless device is a wake-up radio (WUR) mode.

As described above, a wireless device or STA (e.g., a wireless device having a LP-WUR and a WLAN radio) may transmit a request signal to an AP in order to enable a power save protocol between the AP and the wireless device. In some embodiments, a request or response signal, such as the WUR Action frame format 600, may include one or more parameters (e.g., parameters 602-608) defining the power save protocol and the wireless device (e.g., STA) may receive a response signal, including one or more of the parameters, from the AP acknowledging the request signal. In some embodiments, in response to a request signal from a STA, an AP may encode a response signal utilizing a WUR Action frame format 600, for transmission to a STA, to acknowledge the request signal. Further, in some embodiments, the STA may transmit to the AP a WUR signal indicating that the wireless device is entering a WUR mode. The WUR signal may be included within the WUR Action frame format 600.

In some embodiments, elements that are defined with respect to a WUR mode, for example WUR Doze interval or WUR Awake interval, or elements with respect to an existing power save protocol, can be applied within the WUR action frame for the purpose of causing a STA (e.g., a LP-WUR or WLAN radio of a STA) to change state (e.g., Doze, Awake). In some embodiments, the STA can use the WUR Action frame format 600 to negotiate with an AP an interval of sleep or wake-up duration of a LP-WUR or WLAN radio of a STA, and these parameters can be defined in WUR Parameters 508. In some embodiments, the STA (e.g., wireless device having a LP-WUR and WLAN) can communicate to an AP an interval of time that the wireless device will be in a WUR mode, including one or more of the parameters defined in in an action frame, including a WUR Action frame (e.g., WUR Action frame 600), among other action frames.

Figure 7:
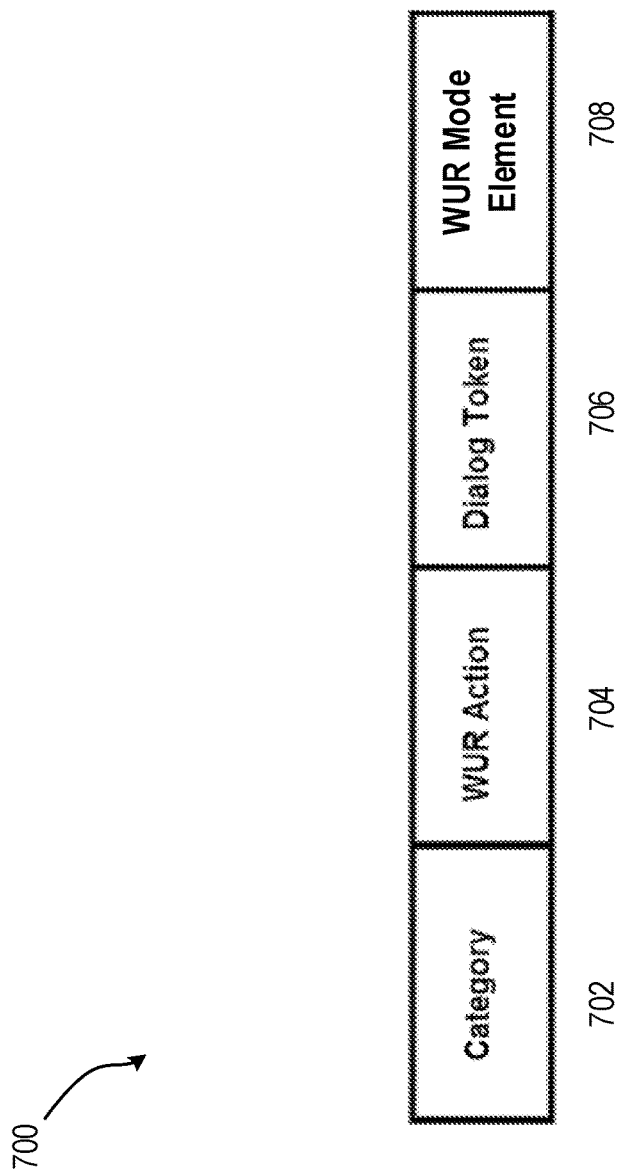
FIG. 7 illustrates an example request and/or response signal frame format in accordance with some embodiments.

FIG. 7 illustrates an example request and/or response signal format 700 (e.g., WUR Action frame format 700) in accordance with some embodiments, where the WUR Action frame format is directly defined, not being based on an existing power-save protocol. In some embodiments, the WUR Action frame format 700 includes various parameters with respect to a LP-WUR, including Category 702, WUR Action 704, Dialog Token 706 and WUR Mode Element 708. In some embodiments, the WUR Mode Element is a defined element that can include various parameters with respect to a power-save protocol for a LP-WUR (e.g., WUR Mode parameters shown in FIG. 8). Similar to FIGS. 5 and 6, the WUR Action frame format 700 can define different actions for a STA that includes a LP-WUR and a WLAN.

In some embodiments, a WUR Action frame format 700 is used for the purpose of request and/or response signaling with respect to a wireless device (e.g., STA) having a wake-up radio (e.g., LP-WUR 425). In some embodiments, the WUR Action frame format 700 may include one or more parameters of a request or response signal, for example, indications of time durations that the wireless device is in a wake-up radio (WUR) mode. As described above, a wireless device or STA (e.g., a wireless device having a LP-WUR and a WLAN radio) may transmit a request signal to an AP in order to enable a power save protocol between the AP and the wireless device. In some embodiments, a request or response signal, such as WUR Action frame format 700, may include one or more parameters (e.g., parameters 702-708) defining the power save protocol and the wireless device (e.g., STA) may receive a response signal, including one or more of the parameters, from the AP acknowledging the request signal. In some embodiments, in response to a request signal from a STA, an AP may encode a response signal utilizing a WUR Action frame format, for transmission to a STA, to acknowledge the request signal. Further, in some embodiments, the STA may transmit to the AP a WUR signal indicating that the wireless device is entering a WUR mode. The WUR signal may be included within the WUR Action frame format 700 as a parameter or within a WUR Mode Element 708, with respect to the WUR parameters shown in FIG. 8.

In some embodiments, similar to FIG. 6, the STA can use a WUR Action frame format (e.g., WUR Action frame format 700) to negotiate with an AP an interval of sleep or wake-up duration of a LP-WUR or WLAN radio of a STA, and these parameters can be defined in WUR Mode Element 708. In some embodiments, the STA can communicate to an AP an interval of time that the wireless device will be in a WUR mode, including one or more of the parameters defined in in an action frame, including the WUR Action frame 700 or the WUR Mode Element 708.

Figure 8:
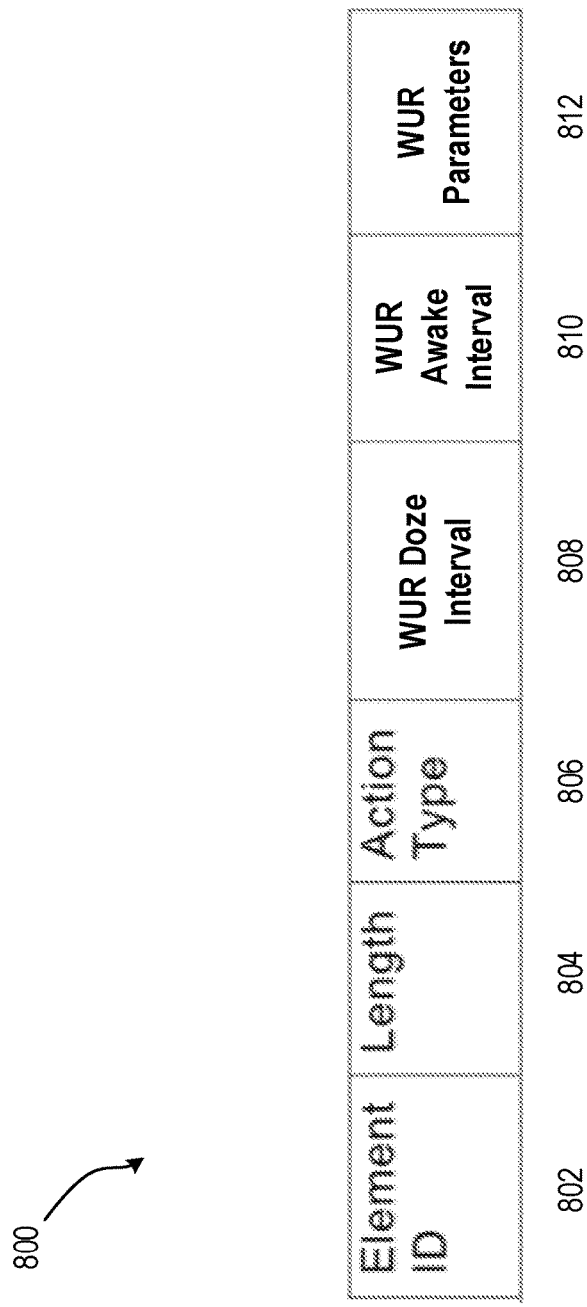
FIG. 8 illustrates example power-save protocol parameters in accordance with some embodiments.

FIG. 8 illustrates example power-save protocol parameters (e.g., WUR parameters) that are associated with the WUR Mode Element 708, in accordance with some embodiments. Similar to FIGS. 6 and 7, a wireless device (e.g., STA) may utilize parameters defined for a WUR Mode (e.g., WUR parameters 802-812) to communicate WUR mode actions related to a LP-WUR and WLAN radio of the wireless device with an AP, and the WUR parameters 800 may be carried in the WUR Mode Element 708. The WUR parameters, in some embodiments, can include an Element ID 802, a Length 804, an Action Type 806, a WUR Doze Interval 808, a WUR Awake Interval 810, and other WUR parameters 812. In some embodiments, a STA can utilize the WUR parameters 800, for example parameters 802-812, for a WUR mode request and/or response. In some embodiments, the STA can use the WUR parameters 800 to negotiate with an AP an interval of sleep (e.g., WUR Doze Interval 808) or wake-up duration (e.g., WUR Awake Interval 810) of a LP-WUR or WLAN radio of a STA. In some embodiments, the STA (e.g., wireless device having a LP-WUR and WLAN) can communicate to an AP an interval of time that the wireless device will be in a WUR mode by carrying the WUR Mode element 704, including one or more of the parameters defined in the WUR Mode frame format 800, in an action frame, including a WNM Action frame format (e.g., WNM Action frame format 500) or a WUR Action frame format (e.g., WUR Action frame format 600 or 700), among other action frames.

In some embodiments, therefore, existing signaling protocols (e.g., power save protocols) between the STA and AP may be utilized to indicate that the STA has entered a Doze state and that an AP cannot send data packets to the STA, such as Wireless Network Management (WNM), Unscheduled Automatic Power Save Delivery (U-APSD), or Power Save Poll (PS-POLL) or Power Save Mode (PSM). A WUR action frame can be defined for a radio sleep request for the STA to inform AP that STA has entered a sleep state (e.g., WLAN radio or LP-WUR is off), and that an AP should not send data to the STA.

In some embodiments, the STA can utilize an action frame (e.g., WNM Action 504, WUR Action 604 or 704, Action Type 806) or a WUR Action frame format 700, with WUR Mode Element 708, to inform the AP that the STA (e.g. IEEE 802.11 radio, LP-WUR) has entered a sleep state (e.g., Doze state). With respect to the AP, in some embodiments, one of an IEEE 802.11 radio is always on, as defined in certain existing current specifications. In some embodiments, a wake-up radio (e.g., LP-WUR) is always on if there is at least one associated STA that negotiates a wake-up mode (e.g., WUR mode) with the AP.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

The following describes various examples of methods, machine-readable media, and systems (e.g., machines, devices, or other apparatus) discussed herein.

A first example provides an apparatus of a station (STA), the apparatus comprising processing circuitry, and memory, configured to encode, for transmission to an access point (AP), a request frame to enable a power save protocol between the AP and the STA, the request frame including one or more wake-up radio (WUR) parameters defining the power save protocol, including an indication for the AP to refrain from transmitting data packets to the STA and to transmit wake-up packets to the STA when the STA is in a WUR mode, decode a response frame from the AP, the response frame including an acknowledgment of the request frame, and initiate the power save protocol, including encode for transmission to the AP, a WUR frame that includes one or more WUR parameters to indicate to the AP that the STA is entering the WUR mode, and enable a WUR mode, wherein during the WUR mode, a low-power wake-up radio (LP-WUR) of the STA is configured to receive wake-up packets from the AP.

A second example provides an apparatus according to the first example, wherein during the WUR mode, a WLAN radio of the STA is in a Doze state, wherein during the Doze state, the WLAN radio is configured to refrain from receiving RF signals from the AP; and wherein after the STA receives a wake-up packet from the AP, the LP-WUR is configured to send a wake-up signal to the WLAN radio, causing the WLAN radio to change from the Doze state to an Awake state, wherein during the Awake state, the WLAN radio is configured to receive data packets from the AP.

A third example provides an apparatus according to the second example, wherein the LP-WUR is further configured to change from an Awake state to a Doze state after sending a wake-up signal to the WLAN radio, wherein during the Doze state the LP-WUR is configured to refrain from receiving wake-up packets from the AP and during the Awake state the LP-WUR is configured to receive wake-up packets from the AP.

A fourth example provides an apparatus according to the third example, wherein the one or more WUR parameters of the request signal includes an indication of a duration of time that the STA is in the WUR mode.

A fifth example provides an apparatus according to the third example, wherein the request frame is a wireless network management (WNM) Action frame and the apparatus is further configured to encode, at the STA for transmission to the AP, any of the one or more WUR parameters into the WNM Action frame.

A sixth example provides an apparatus according to the third example, wherein the request frame is a WUR Action frame and the apparatus is further configured to encode, at the STA for transmission to the AP, any of the one or more WUR parameters into the WUR Action frame.

A seventh example provides an apparatus according to the sixth example, wherein the one or more WUR parameters are included in a WUR element of the WUR Action frame.

An eighth example provides an apparatus according to the third example, wherein the STA is configured to periodically enter the WUR mode and the one or more WUR parameters of the request signal includes an indication of a specific schedule that the STA is in the WUR mode.

A ninth example provides an apparatus according to the eighth example, wherein the WLAN radio is configured to remain in the Doze state, during a duration of time that the STA is in the WUR mode, until the LP-WUR of the STA receives a wake-up packet.

A tenth example provides an apparatus according to the sixth example, wherein the response frame from the AP is a WUR Action frame and further includes one or more WUR parameters.

An eleventh example provides an apparatus according to the sixth example, wherein the one or more WUR parameters are included in a WUR element of the WUR Action frame.

A twelfth example provides a computer-readable hardware storage device that stores instructions for execution by one or more processors of a station (STA), the instructions to configure the one or more processors to encode for transmission to an access point (AP), a request frame to enable a power save protocol between the AP and the STA, the request frame including one or more wake-up radio (WUR) parameters defining the power save protocol, including an indication for the AP to refrain from transmitting data packets to the STA and to transmit wake-up packets to the STA when the STA is in a WUR mode, decode a response frame from the AP, the response frame including an acknowledgment of the request frame; and initiate the power save protocol, including encode for transmission to the AP, a WUR frame that includes one or more WUR parameters to indicate to the AP that the STA is entering the WUR mode, and enable a WUR mode, wherein during the WUR mode, a low-power wake-up radio (LP-WUR) of the STA is configured to receive wake-up packets from the AP.

A thirteenth example provides a computer-readable hardware storage device according to the twelfth example, wherein during the WUR mode, a WLAN radio of the STA is in a Doze state, wherein during the Doze state, the WLAN radio is configured to refrain from receiving RF signals from the AP; and wherein after the STA receives a wake-up packet from the AP, the LP-WUR is configured to send a wake-up signal to the WLAN radio, causing the WLAN radio to change from the Doze state to an Awake state, wherein during the Awake state, the WLAN radio is configured to receive data packets from the AP.

A fourteenth example provides a computer-readable hardware storage device according to the thirteenth example, wherein the LP-WUR is further configured to change from an Awake state to a Doze state after sending a wake-up signal to the WLAN radio, wherein during the Doze state the LP-WUR is configured to refrain from receiving wake-up packets from the AP and during the Awake state the LP-WUR is configured to receive wake-up packets from the AP.

A fifteenth example provides a computer-readable hardware storage device of claim 14, wherein the request frame is a WUR Action frame and the one or more processors are further configured to encode, at the STA for transmission to the AP, any of the one or more WUR parameters into the WUR Action frame.

A sixteenth example provides a computer-readable hardware storage device according to the fifteenth example, wherein the one or more WUR parameters are included in a WUR element of the WUR Action frame.

A seventeenth example provides a method implemented at a station (STA), the method comprising encoding for transmission to an access point (AP), a request frame to enable a power save protocol between the AP and the STA, the request frame including one or more wake-up radio (WUR) parameters defining the power save protocol, including an indication for the AP to refrain from transmitting data packets to the STA and to transmit wake-up packets to the STA when the STA is in a WUR mode, decoding a response frame from the AP, the response frame including an acknowledgment of the request frame, and initiating the power save protocol, including encoding for transmission to the AP, a WUR frame that includes one or more WUR parameters to indicate to the AP that the STA is entering the WUR mode, and enabling a WUR mode, wherein during the WUR mode, a low-power wake-up radio (LP-WUR) of the STA is configured to receive wake-up packets from the AP.

An eighteenth example provides a method according to the seventeenth example, wherein during the WUR mode, a WLAN radio of the STA is in a Doze state, wherein during the Doze state, the WLAN radio is configured to refrain from receiving RF signals from the AP; and wherein after the STA receives a wake-up packet from the AP, the LP-WUR is configured to send a wake-up signal to the WLAN radio, causing the WLAN radio to change from the Doze state to an Awake state, wherein during the Awake state, the WLAN radio is configured to receive data packets from the AP.

A nineteenth example provides a method according to the eighteenth example, wherein the LP-WUR is further configured to change from an Awake state to a Doze state after sending a wake-up signal to the WLAN radio, wherein during the Doze state the LP-WUR is configured to refrain from receiving wake-up packets from the AP and during the Awake state the LP-WUR is configured to receive wake-up packets from the AP.

A twentieth example provides a method according to the nineteenth example, wherein the request frame is a WUR Action frame and the method further comprising encoding for transmission to the AP, any of the one or more WUR parameters into the WUR Action frame.

What is claimed is:

1. An apparatus of a station (STA), the apparatus comprising: processing circuitry, and memory, configured to:
   encode, for transmission to an access point (AP), a request frame to enable a power save protocol between the AP and the STA, the request frame including one or more wake-up radio (WUR) parameters defining the power save protocol, including an indication for the AP to refrain from transmitting data packets to the STA and to transmit wake-up packets to the STA when the STA is in a WUR mode;
   decode a response frame from the AP, the response frame including an acknowledgment of the request frame; and
   initiate the power save protocol, including:
   encode for transmission to the AP, a WUR frame that includes one or more WUR parameters to indicate to the AP that the STA is entering the WUR mode, and enable a WUR mode, wherein during the WUR mode, a low-power wake-up radio (LP-WUR) of the STA is configured to receive wake-up packets from the AP.

2. The apparatus of claim 1, wherein during the WUR mode, a WLAN radio of the STA is in a Doze state, wherein during the Doze state, the WLAN radio is configured to refrain from receiving RF signals from the AP; and wherein after the STA receives a wake-up packet from the AP, the LP-WUR is configured to send a wake-up signal to the WLAN radio, causing the WLAN radio to change from the Doze state to an Awake state, wherein during the Awake state, the WLAN radio is configured to receive data packets from the AP.

3. The apparatus of claim 2, wherein the LP-WUR is further configured to change from an Awake state to a Doze state after sending a wake-up signal to the WLAN radio, wherein during the Doze state the LP-WUR is configured to refrain from receiving wake-up packets from the AP and during the Awake state the LP-WUR is configured to receive wake-up packets from the AP.

4. The apparatus of claim 3, wherein the one or more WUR parameters of the request signal includes an indication of a duration of time that the STA is in the WUR. mode.

5. The apparatus of claim 3, wherein the request frame is a wireless network management (WNM) Action frame and the apparatus is further configured to encode, at the STA for transmission to the AP, any of the one or more WUR parameters into the WNN1 Action frame.

6. The apparatus of claim 3, wherein the request frame is a WUR Action frame and the apparatus is further configured to encode, at the STA for transmission to the: P, any of the one or more WUR parameters into the WUR Action frame.

7. The apparatus of claim 6, wherein the one or more WUR parameters are included in a WUR element of the WUR Action frame.

8. The apparatus of claim 3, wherein the STA is configured to periodically enter the WUR. mode and the one or more WUR parameters of the request signal includes an indication of a specific schedule that the STA is in the WUR mode.

9. The apparatus of claim 8, wherein the WL.AN radio is configured to remain in the Doze state, during a duration of time that the STA is in the WUR mode, until the LP-WUR of the STA receives a wake-up packet.

10. The apparatus of claim 6, wherein the response frame front the AP is a WUR Action frame and further includes one or more WUR parameters.

11. The apparatus of claim 10, wherein the one or more WUR parameters are included in a WUR element of the WUR Action frame.

12. (Currently Amended) A computer-readable hardware storage device, stored thereon instructions for execution by one or more processors of a station (STA), the instructions to configure the one or more processors to:

encode for transmission to an access point (AP), a request frame to enable a power save protocol between the AP and the STA, the request frame including one or more wake-up radio (WUR) parameters defining the power save protocol, including an indication for the AP to refrain from transmitting data packets to the STA and to transmit wake-up packets to the STA when the STA is in a WUR mode;

decode a response frame from the AP, the response frame including an acknowledgment of the request frame; and initiate the power save protocol, including:
encode for transmission to the AP, a WUR frame that includes one or more WUR parameters to indicate to the AP that the STA is entering the WUR mode, and enable a WUR mode, wherein during the WUR mode, a low-power wake-up radio (LP-WUR) of the STA is configured to receive wake-up packets from the AP.

13. The computer-readable hardware storage device of claim 12, wherein during the WUR mode, a WLAN radio of the STA is in a Doze state, wherein during the Doze state, the WLAN radio is configured to refrain from receiving RF signals from the AP; and wherein after the STA receives a wake-up packet from the AP, the LP-WUR is configured to send a wake-up signal to the WLAN radio, causing the WLAN radio to change from the Doze state to an Awake state, wherein during the Awake state, the WLAN radio is configured to receive data packets from the AP.

14. The computer-readable hardware storage device of claim 13, wherein the LP-WUR is further configured to change from an Awake state to a Doze state after sending a wake-up signal to the WLAN radio, wherein during the Doze state the LP-WUR is configured to refrain from receiving wake-up packets from the AP and during the Awake state the LP-WUR is configured to receive wake-up packets from the AP.

15. The computer-readable hardware storage device of claim 14, wherein the request frame is a WUR Action frame and the one or more processors are further configured to encode, at the STA for transmission to the AP, any of the one or more WUR parameters into the WUR Action frame.

16. The computer-readable hardware storage device of claim 15, wherein the one or more WUR parameters are included in a WUR element of the WUR Action frame.

17. A method implemented at a station (STA), the method comprising:

encoding for transmission to an access point (AP), a request frame to enable a power save protocol between the AP and the STA, the request frame including one or more wake-up radio (WUR) parameters defining the power save protocol, including an indication for the AP to refrain from transmitting data packets to the STA and to transmit wake-up packets to the STA when the STA is in a WUR mode;

decoding a response frame from the AP, the response frame including an acknowledgment of the request frame; and initiating the power save protocol, including:
encoding for transmission to the AP, a WUR frame that includes one or more WUR parameters to indicate to the AP that the STA is entering the WUR mode, and enabling a WUR mode, wherein during the WUR mode, a low-power wake-up radio (LP-WUR) of the STA is configured to receive wake-up packets from the AP.

18. The method of claim 17, wherein during the WUR mode, a WLAN radio of the STA is in a Doze state, wherein during the Doze state, the WLAN radio is configured to refrain from receiving RF signals from the AP; and wherein after the STA receives a wake-up packet from the AP, the LP-WUR is configured to send a wake-up signal to the WLAN radio, causing the WLAN radio to change from the Doze state to an Awake state, wherein during the Awake state, the WLAN radio is configured to receive data packets from the AP.

19. The method of claim 18, wherein the LP-WUR is further configured to change from an Awake state to a Doze state after sending a wake-up signal to the WLA N radio, wherein during the Doze state the LP-WUR is configured to refrain from receiving wake-up packets from the AP and during the Awake state the LP-WUR is configured to receive wake-up packets from the AP.

20. The method of claim 19, wherein the request frame is a WUR Action frame and the method further comprising encoding for transmission to the AP, any of the one or more WUR parameters into the WUR Action frame.

* * * * *

UNITED STATES PATENT AND TRADEMARK OFFICE
CERTIFICATE OF CORRECTION

| | | |
|---|---|---|
| PATENT NO. | : 10,194,394 B2 | Page 1 of 1 |
| APPLICATION NO. | : 15/392398 | |
| DATED | : January 29, 2019 | |
| INVENTOR(S) | : Huang et al. | |

It is certified that error appears in the above-identified patent and that said Letters Patent is hereby corrected as shown below:

On the Title Page

Item (65), in "Prior Publication Data", in Column 1, Line 1, after "2018", insert --¶Related U.S. Application Data (60) Provisional application No. 62/374,154, filed on Aug. 12, 2016.--

In the Claims

In Column 20, Line 17, in Claim 1, after "and", insert --¶--

In Column 20, Line 40, in Claim 4, delete "WUR." and insert --WUR-- therefor

In Column 20, Line 45, in Claim 5, delete "WNN1" and insert --WNM-- therefor

In Column 20, Line 48, in Claim 6, delete "the: P," and insert --the AP,-- therefor In Column 20, Line 54, in Claim 8, delete "WUR." and insert --WUR-- therefor In Column 20, Line 58, in Claim 9, delete "WL.AN" and insert --WLAN-- therefor In Column 20, Line 63, in Claim 10, delete "front" and insert --from-- therefor In Column 21, Line 1, in Claim 12, delete "Currently Amended) A" and insert --A-- therefor In Column 21, Line 19, in Claim 12, after "and", insert --¶--

In Column 22, Line 35, in Claim 19, delete "WLA N" and insert --WLAN-- therefor

Signed and Sealed this
Fifth Day of May, 2020

Andrei Iancu
*Director of the United States Patent and Trademark Office*